United States Patent [19]
Hurst, Jr.

[11] Patent Number: 5,731,837
[45] Date of Patent: Mar. 24, 1998

[54] QUANTIZATION CIRCUITRY AS FOR VIDEO SIGNAL COMPRESSION SYSTEMS

[75] Inventor: Robert Norman Hurst, Jr., Hopewell, N.J.

[73] Assignee: Thomson Multimedia, S.A., Boulogne, Cedex, France

[21] Appl. No.: 591,075

[22] Filed: Jan. 25, 1996

[51] Int. Cl.[6] .................... H04N 7/12; H04N 11/02; H04N 11/04
[52] U.S. Cl. .................... 348/405; 348/419; 341/200
[58] Field of Search .................... 348/405, 419; 341/200; H04N 11/02, 11/04, 7/12

[56]  References Cited

U.S. PATENT DOCUMENTS

| | | | |
|---|---|---|---|
| 4,897,855 | 1/1990 | Acampora | 375/27 |
| 5,038,209 | 8/1991 | Hang | 358/136 |
| 5,072,295 | 12/1991 | Murakami et al. | 358/136 |
| 5,089,888 | 2/1992 | Zdepski et al. | 358/133 |
| 5,111,294 | 5/1992 | Asai et al. | 358/136 |
| 5,144,424 | 9/1992 | Savatier | 358/133 |
| 5,410,351 | 4/1995 | Kojima | 348/401 |
| 5,426,463 | 6/1995 | Reininger et al. | 348/405 |
| 5,461,422 | 10/1995 | Hsieh | 348/405 |
| 5,521,643 | 5/1996 | Yim | 348/405 |
| 5,534,929 | 7/1996 | Tanaka | 348/405 |

*Primary Examiner*—Amelia Au
*Assistant Examiner*—Nhon T. Diep
*Attorney, Agent, or Firm*—Joseph S. Tripoli; Eric P. Herrmann; Ronald H. Kurdyla

[57]  ABSTRACT

In a compression system including a quantizer for quantifying a matrix of coefficients according to a matrix of quantizing values, and which is responsive to rate buffer occupancy for providing quantizing scale factors to modify the quantizing matrix, significant channel capacity may be salvaged without significant loss of image quality by incorporating apparatus to limit the minimum values of quantizing scale factors that are applied to the quantizing matrix.

14 Claims, 4 Drawing Sheets

QUANTIZATION CIRCUITRY AS FOR VIDEO SIGNAL COMPRESSION SYSTEMS

This invention relates to circuitry for processing a quantizing control signal used in video signal compression processes.

BACKGROUND OF THE INVENTION

Digital data delivery systems that deliver compressed video signal which has been coded using MPEG (Moving Picture Experts Group) or MPEG-like compression systems, may be designed to carry further data in the same channel whenever the channel is not fully occupied by the compressed video signal. Such systems may be of the type which time multiplex, according to signal statistics, a plurality of unrelated compressed signals on a common channel, or they may be of the high-low priority type which time multiplexes related compressed high and low priority data from a single signal.

Both of the foregoing types of systems rely on some form of rate control of the respective compressed signals to insure that there is at least some signal capacity for all of the compressed components to be included on a bandwidth limited channel. However, rate control systems implemented in video compression apparatus are usually designed to expend as many bits as possible to code video, even when little or no subjective improvement results from the extra bits utilized. Typically, rate control algorithms are designed to limit the maximum data rate allocated for the compressed video signal. This technique always reserves some minimum data space for secondary signals. A drawback of this approach is that reproduced video quality, for complex video images that are difficult to encode, will be impaired.

SUMMARY OF THE INVENTION

The present invention overcomes the foregoing drawback, in an MPEG or MPEG-like compression system by including circuitry and/or software code, to limit the smallest value of the MPEG Quantization Scale Factor, (or its equivalent in non-MPEG systems) rather than by directly limiting the compressed video signal bit rate.

DETAILED DESCRIPTION

This invention will be described in the environment of an MPEG or MPEG-like compression system, however as described it will apply to any video compression system which includes a quantizer which divides coded information by a quantizing factor. That is, systems wherein the quantized result for a given codeword is inversely proportional to the quantizing factor. Corresponding similar apparatus may be assembled for systems wherein the quantized result for a given codeword is directly proportional to the quantizing factor, in other words systems which limit the quantizing factor to produce limited valued codewords.

Figure 1:
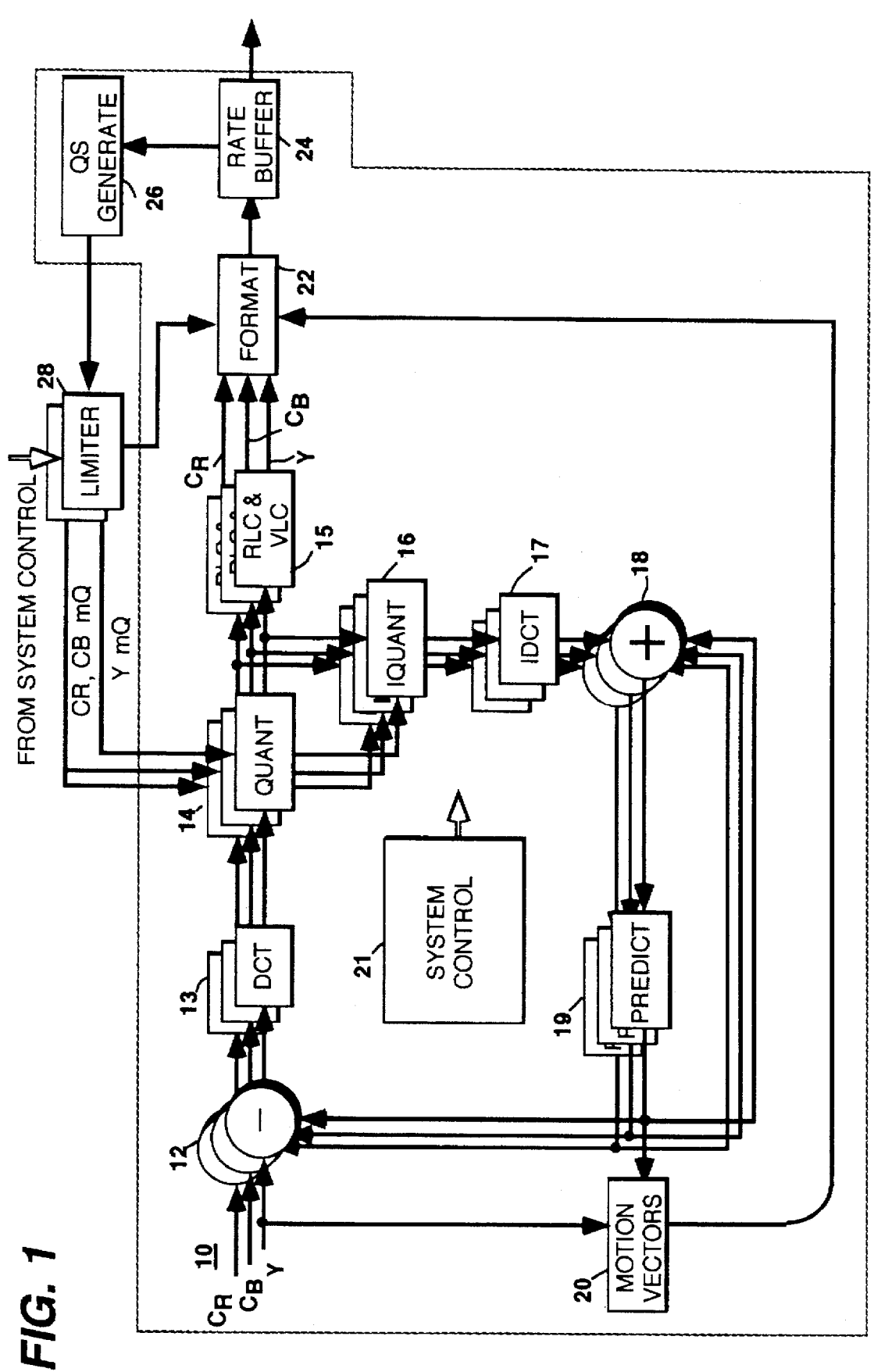
FIG. 1 is a block diagram of a video signal compression system including quantizing control embodying the present invention.

Referring to FIG. 1, the elements 10 to 26, circumscribed by the dashed line, comprise a typical motion compensated predictive encoder of the type utilized to produce compressed video signal in an MPEG-like format. There are three parallel processing paths shown, respective ones of which process the luminance and two chrominance video components. Motion compensation apparatus 20 operates on the luminance signal to generate motion vectors, which vectors are used in the three processing paths. A common controller 21 communicates with the respective processing circuitry and directs the general operation of the encoder. The operation of motion compensated predictive encoders is well known and will not be described in detail herein Suffice it to say that elements 12 to 20 and 26 perform signal compression, element 22 arranges compressed signal components according to a desired protocol, e.g. MPEG-like, and element 24 translates bursts of data from the formatter 22 to constant rate data. Elements 24, 26 and 14 cooperate to insure that there is neither too much or too little coded data, and thereby preclude rate buffers at respective receivers from overflowing or underflowing.

The rate buffer 24 (or a video buffering verifier, VBV, as described in the MPEG standard) provides a measure of buffer occupancy and/or a measure of rate of change of buffer occupancy to a quantizer scale factor generator 26. The quantizer scale factor generator 26 produces scale factors QS which are subsequently utilized in the quantizer 14 to modify values in a quantizing matrix. This modification tends to throttle the rate of generation of compressed codewords.

Quantizer scale factor generators are known to those skilled in the video signal compression arts. They occur in many forms and operate according to a variety of algorithms. Representative apparatus and algorithms may be found in U.S. Pat. Nos. 5,426,463; 5,144,424; 5,089,888; 5,072,295; and 4,897,855.

The data applied to the quantizer 14 is presumed to occur as e.g. 8×8 matrices C[v][u] of coefficients, $c_i$, and the quantizer is assumed to perform a quantizing operation of the form;

$$Q(C) = \frac{16 C[v][u]}{W[w][v][u] \times QS} - \frac{k}{2} \qquad (1)$$

where Q(C) is the quantized matrix, C[v][u] is the coefficient matrix, [v][u] are matrix indices, W[w] is one of w quantization matrices, QS is the scale factor from element 26 and k is the sign of the coefficient. From the equation for Q(C), it may be seen that the magnitude of the values Q(C) are inversely proportional to the value of the quantizing scale factor QS. Thus if it is desired to reduce the amount of coded data, all values of QS should be limited to occur above a certain minimum. The limiting apparatus 28, interposed between the quantizing scale factor generator 26 and the quantizer 14 performs this function. Element 28 passes all quantizing scale factors which occur above a predetermined minimum value and passes the minimum value otherwise. Incorporation of the limiting element 28 dramatically alters the volume of coded data as may be seen from FIGS. 5 and 6.

The astute designer will recognize that the quantizing scale factors must be inherently limited to values greater than zero to preclude division by zero. The limiter in this invention is selectively operated and performs additional limiting over and above the inherent limiting necessary to preclude division by zero. For example, the MPEG2 standard has provision for two modes of operation with two corresponding alternative sets of allowed quantizing scale factors. In a first of these modes (type 1) the smaller quantizing scale factors are assigned values of 1, 2, 3, 4, 5, . . . , and as the quantizing scale factors get larger the sequence becomes nonlinear. In the second mode (type 0) the smaller quantizing scale factors are assigned values of 2, 4, 6, 8, 10, 12. . . etc. The limiter of this invention will be selectively conditioned in the first and second modes to limit the quantizing scale factors to values greater than the minimum values assigned, that is greater than at least 1 and 2 for the first and second modes respectively.

The reader is reminded that the limiter provided in this invention performs an optional function. When it is desired to carve excess channel space for auxiliary data, the limiter is made operative. Otherwise it may be conditioned to perform a unity function.

Figure 5:
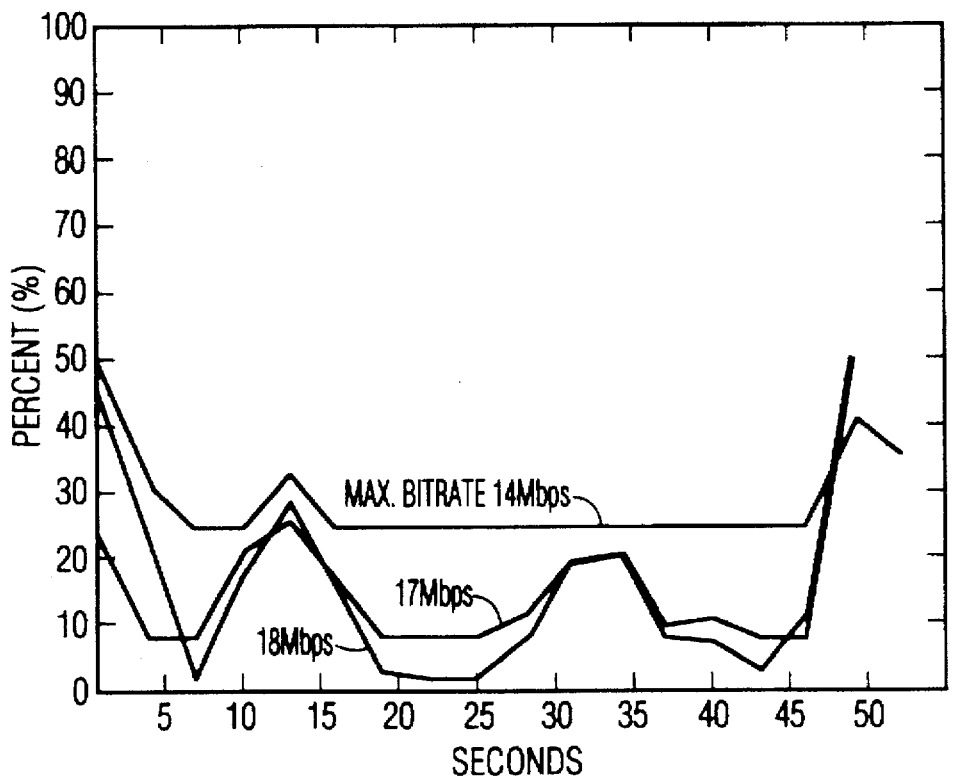
FIGS. 5 and 6 show measured results of rate buffer occupancy for compression apparatus of the type exemplified in FIG. 1, without and with quantizing scale factor limiting circuitry included, respectively.

FIG. 5 is a graph showing the percent of channel capacity available for conveying other information if a typical video signal is compressed according to a constant bit rate, CBR algorithm. The data was taken from a Grand Alliance prototype encoder coding a 1920×1080 interlaced sequence at 60 fields per second. FIG. 5 shows the available capacity with the compression apparatus adjusted to produce three different constant bit rates of 14 Mbps, 17 Mbps and 18 Mbps.

Figure 6:
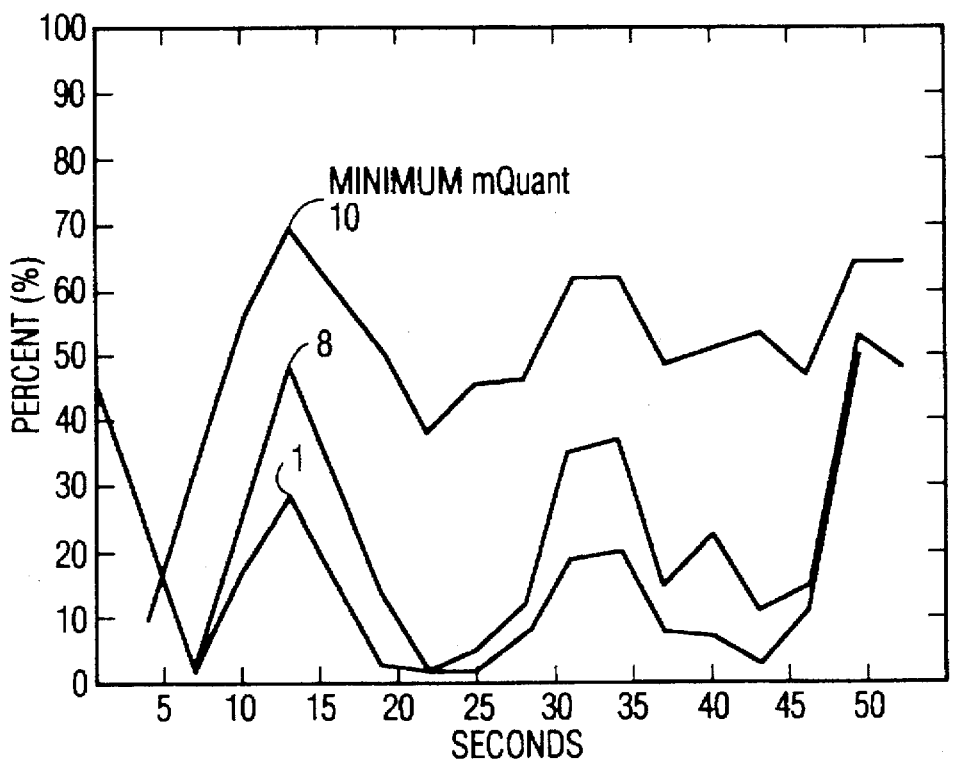

The data in FIG. 6 was taken for the identical set of conditions with the compression apparatus adjusted to produce 18 Mbps. However, in this instance, the minimum value of QS was limited to values of 10, 8 and 1. That is, an element similar to element 28 was inserted into the apparatus which produced the FIG. 5 results. With the minimum value of QS limited to one, the limiter in this circuitry effectively performs the unity function and the bottom curve in FIGS. 6 is seen to be identical to the bottom curve of FIG. 5. There were not significant differences in the quality of reproduced images between the two sets of compressed data. However, it is immediately apparent that inclusion of a quantizing scale factor limiter frees up a significant amount of channel capacity.

Figure 2:
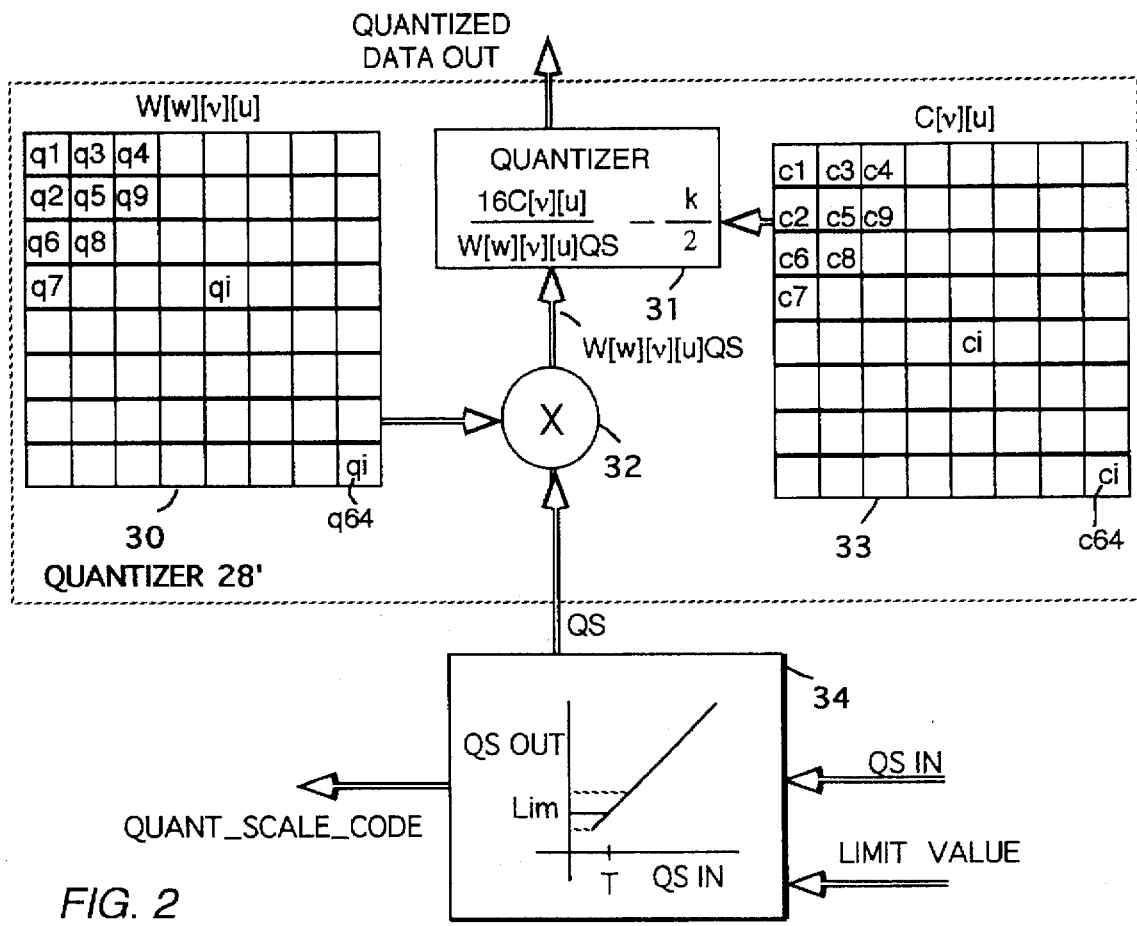
FIG. 2 is a block diagram of exemplary quantizing apparatus which may be implemented for the quantizer in the FIG. 1 system.

An exemplary quantization process is elucidated with respect to FIG. 2. In FIG. 2 the block 33 represents a block or matrix of coefficient data output from the DCT element 13 (FIG. 1). The respective coefficients C[v][u] or $c_i$ (corresponding to discrete cosine transform coefficients for example) are arranged in a predetermined order. The block designated 30 represents a matrix W[v][u] of quantization values $q_i$. These quantization values were determined so as to provide greater and lesser quantization to coefficients in the block 33 which are of lesser and greater importance, respectively, to image reproduction. Thus when coefficients c1, c2, . . . c8 etc. are applied to the quantizer 31, quantization values q1, q2, . . . q8 etc. are concurrently accessed and applied to perform the quantization. However the values qi are indirectly applied to the quantizer 31 via a variable scaling circuit 32. The respective quantization values are scaled by quantizing scale factors QS provided from element 34.

As blocks of coefficients 33 are applied to the quantizer 31, a quantization scale factor from element 34 is applied to the scaling circuit 32 to produce quantization values $QS(q_i)$ or (QS)W[w][v][u], which are coupled to the quantizer 31. The quantizer 31 may be of the form which quantifies or quantizes the respective coefficients as indicated by the equation (1) above or alternatively according to the functions:

$$Q(C) = (16C[v][u] + 8)//(2 * (QS)W[w][v][u]); \quad (2)$$
$$C[v][u] > 0$$

$$Q(C) = (16C[v][u] - 8)//(2 * (QS)W[w][v][u]); \quad (3)$$
$$C[v][u] < 0$$

$$Q(C) = 0; \quad (4)$$
$$C[v][u] = 0$$

where Q(C) is the quantized coefficient matrix, (QS)W[w][v][u]) represents the scaled quantization matrix and // specifies integer division with rounding to the nearest integer and half values rounded away from zero.

The element 34 passes all quantizing-scale factors from the quantizing scale factor generator 26 (FIG. 1) above a set limit, and for lesser values of quantizing scale factors provides the limit value as a quantizing scale factor. The limit values are constrained to values which represent valid quantizing scale factors. The function is illustrated by the solid line graph in the block 34. Dashed lines are included to indicate that the element 34 is programmable to permit use of different limit values. For example if computer generated images, having large flat field areas and sharp feature transitions, are being compressed the limit value may be made relatively small to insure faithful reproduction of the sharp feature transitions. Alternatively, if very busy images with significant motion are being compressed the limit value may be made relatively large. The limit values may also differ depending upon the type of compression being performed e.g. intra or I-frame compression or P or B-frame predictive compression. The relative sizes of the limit values $L_I$, $L_P$, $L_B$ for I, P, and B frame compression respectively, tend to follow the ordering of $L_I < L_P < L_B$. Representative limit values for MPEG quantizing scale factors in the range of 6 to 12 have been found to provide improved performance over non limited scale factors. Depending upon the source material being compressed, other limit values may provide more satisfactory performance. Any limit values greater than 1 and 2 will provide limiting of the quantizing scale factors for the scale factor values in the aforementioned MPEG type 1 and type 2 modes respectively.

In an MPEG system, data corresponding to the quantizing scale factors are transmitted with macroblocks of compressed data. The quantizing scale factors are not sent directly, but rather a coded version thereof denoted quantiser_scale_code. The element 34 may be arranged, for MPEG systems, to incorporate apparatus to transcode the limited quantizing scale factors to quantiser_scale_code values. Such apparatus may be no more than a read only memory which is addressed by the limited quantizing scale factors and programmed at respective address locations with the appropriate quantiser_scale_code values.

Figure 3:
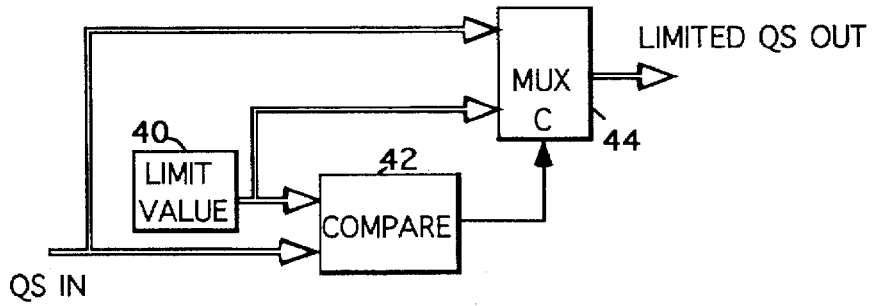
FIGS. 3 and 4 are block diagrams of alternative quantizing scale factor limiting apparatus embodying the present invention.

FIG. 3 illustrates exemplary apparatus for limiting the quantizing scale factors. It includes a multiplexer 44 which is conditioned by a comparator 42 to pass a limit value or the quantizing scale factors from element 26 depending upon whether the comparator 42 exhibits a first or second output state respectively. A limit value, which is provided by an operator from a source 40 is coupled to one input terminal of the comparator and one input of the multiplexor 44. The quantizing scale factors from the element 26 are coupled to a second input terminal of the multiplexer 44 and a second input terminal of the comparator 42. The comparator is arranged to exhibit the first and second output states for the quantizing scale factors being lesser and greater than the limit value respectively.

Figure 4:
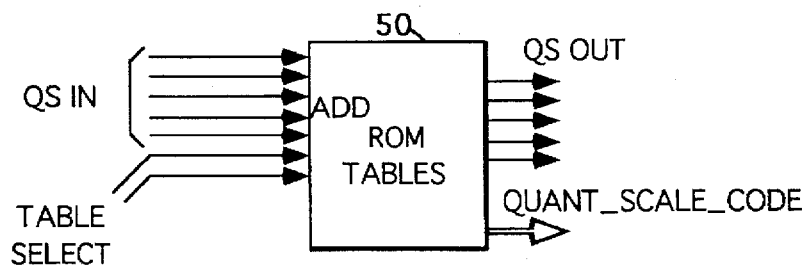

FIG. 4 illustrates alternative apparatus for limiting the quantizing scale factors. In this embodiment, the limiting apparatus consists of a plurality of tables in memory. The quantizing scale factors from the element 26 are coupled to the address input port of the memory. In addition, table select values provided by an operator for example, are coupled to the address input port. The memory output port provides the limited quantizing scale factors.

The different tables correspond to different limit values. Each table is programmed at respective address locations with its respective address value, except for address locations having address values equal to or less than the limit value. Each of these address locations is programmed with the limit value. Each memory location may also be programmed with the appropriate corresponding quantiser__scale__code, which may be concurrently provided with the quantizing scale factor, for inclusion in the respective macroblock of compressed data. In an alternative arrangement, rather than incorporating a plurality of tables in memory, the apparatus may include a single read/write memory table which is programmed with appropriate address values at the start of a compression sequence, by the system controller 21 for example.

Finally, if the system controller has sufficient computing capacity, the limiting function may be performed in software in the controller, using a simple routine to compare and output either the limit value or the quantizing scale factor.

Figure 7:
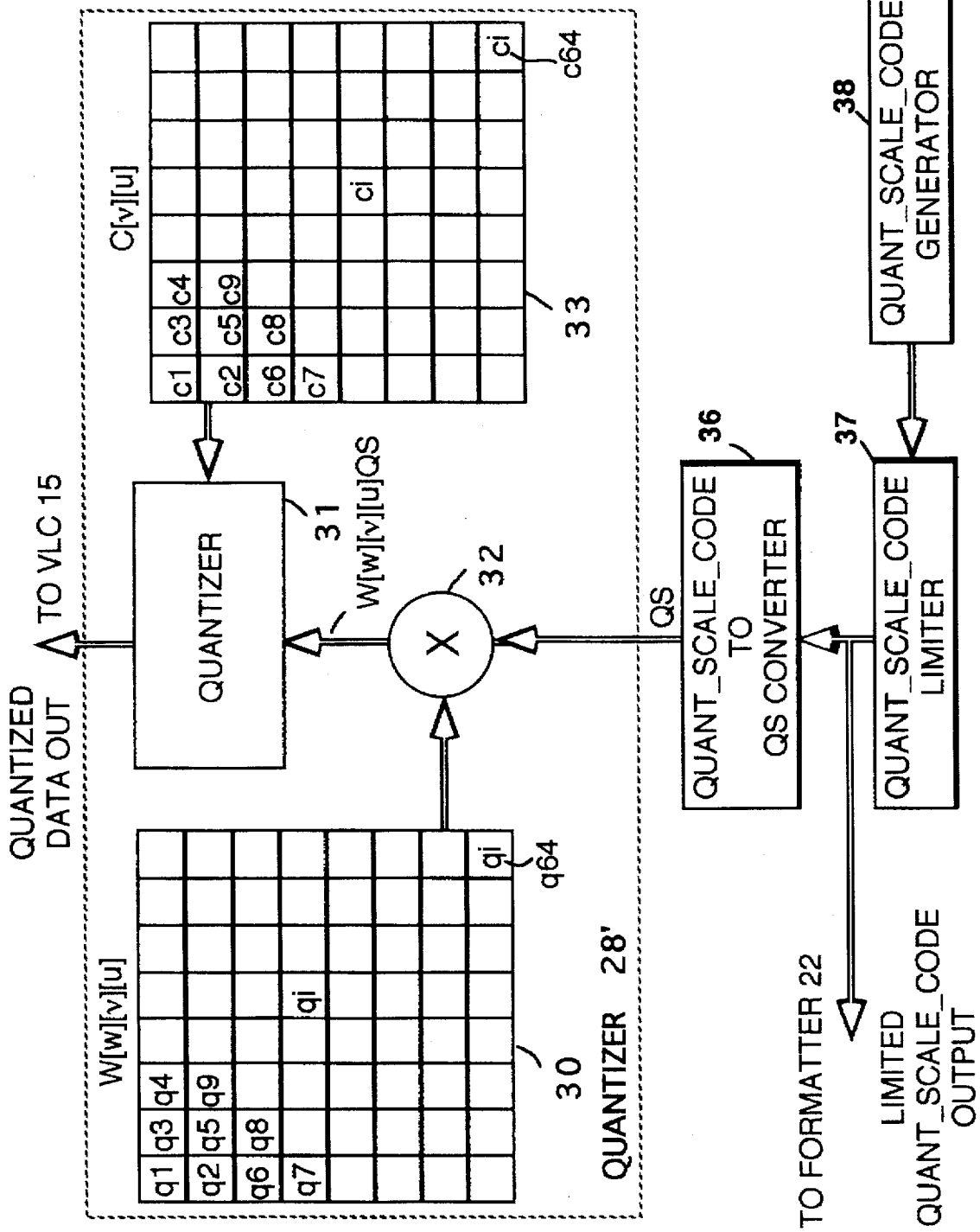
FIG. 7 is a block diagram of alternative exemplary quantizing apparatus which may be implemented for the quantizer in the FIG. 1 system.

FIG. 7 illustrates an alternative quantizing scale factor limiting apparatus. In FIG. 7, elements designated with the same numbers as elements in FIG. 2 are similar and perform the same functions. In this embodiment, a quantiser__scale__code generator 38 is coupled to the rate buffer 24, and generates, e.g. MPEG-2, quantiser__scale__code values in the normal course of operation. These values are applied to a limiter 37 which is conditioned to limit the quantiser__scale__code values to some minimum value which is constrained to be a valid quantiser__scale__code value. The limited quantiser__scale__code codewords are coupled to the formatter 22 for inclusion in the compressed video signal, and they are also applied to a code converter 36. The code converter 36, which may be a read only memory, converts the quantiser__scale__code values to their corresponding quantizing scale factor values, QS, for application to the weighting circuit 32. Since the quantiser__scale__code values applied to the converter 36 are limited, the QS values output from the converter 36 will also be limited.

The limiter 37 may take either of the forms illustrated in FIGS. 3 and 4, or the function may be performed in software. It should be recognized that the limit values may be user selectable or they may be systematically updated as a function of the volume of video data processed.

What I claim is:

1. Video signal compression apparatus comprising:
    a source of video signal to be compressed;
    first compression circuitry for providing partially compressed said video signal;
    second compression circuitry for completing compression of partially compressed video signal;
    a quantizer, coupled between said first and second compression circuitry, for quantizing said partially compressed video signal, said quantizer including an input port for receiving quantizing scale factors;
    apparatus for generating quantizing scale factors in accordance with the rate of compressed data provided by said second compression circuitry; and
    circuitry responsive to said quantizing scale factors for limiting the values of respective quantizing scale factors applied to said quantizer to a predetermined range of values less than the range of quantizing scale factor values provided by said apparatus for generating quantizing scale factors.

2. The apparatus set forth in claim 1 wherein said second compression circuitry includes a rate buffer and said apparatus for generating quantizing scale factors is responsive to the relative fullness of said rate buffer.

3. The apparatus set forth in claim 1 wherein said quantizer comprises;
    a source of a matrix of quantizing values;
    a scaler for scaling said matrix of quantizing values by said quantizing scale factor; and
    circuitry for dividing respective codewords of said partially compressed video signal by respective quantizing values scaled by said quantizing scale factor.

4. The apparatus set forth in claim 1 wherein the apparatus for generating quantizing scale factors and the circuitry for limiting the minimum value quantizing scale factor are subsumed in the same circuitry.

5. The apparatus set forth in claim 1 wherein the apparatus for limiting the minimum value quantizing scale factor is programmable.

6. The apparatus set forth in claim 1 wherein the video signal compression apparatus provides compressed video signal according to an MPEG protocol and said circuitry for limiting the minimum value quantizing scale factor limits respective quantizing scale factors to values greater than 2.

7. The apparatus set forth in claim 6 further including circuitry responsive to one of said limit values and limited said quantizing scale factors for providing limited corresponding quantiser__scale__codes for inclusion in compressed video signal.

8. The apparatus set forth in claim 1 further including circuitry for providing quantiser__scale__code values, corresponding to limited said quantizing scale factors, for inclusion in compressed said video signal.

9. A video signal compression apparatus including a quantizer and a rate buffer coupled to receive data provided by said quantizer, and further including apparatus responsive to occupancy levels of said rate buffer for generating quantizing scale factors to control said quantizer, and limiting apparatus for limiting the values of respective quantizing scale factors applied to said quantizer to a predetermined range of values different than the range of quantizing scale factor values provided by said apparatus for generating quantizing scale factors.

10. The video signal compression apparatus set forth in claim 9 further including circuitry responsive to said limit values for providing limited corresponding quantiser__scale__codes for inclusion in compressed video signal.

11. The video signal compression apparatus set forth in claim 9 further including circuitry responsive to limited said quantizing scale factors for providing limited corresponding quantiser__scale__codes for inclusion in compressed video signal.

12. The video signal compression apparatus set forth in claim 9 wherein said apparatus responsive to occupancy levels of said rate buffer for generating quantizing scale factors comprises:
    a quantiser__scale__code generator coupled to said rate buffer for generating quantiser__scale__codes;
    a quantiser__scale__code limiter coupled to said quantiser__scale__code generator for limiting the values of said quantiser_scale_code s, to values larger than the minimum value that is provided by said quantiser_scale_code generator; and a quantiser_scale_code-to-quantizing scale factor converter coupled to said quantiser_scale_code limiter.

13. A method, in a video signal compression apparatus including a quantizer and circuitry responsive to compressed video signal provided by said quantizer for generating quantizing scale factors to control said quantizer, for reducing the average quantity of compressed data representing said video signal comprising the step of limiting the values of respective quantizing scale factors applied to said quantizer to a predetermined range of values different than the range of quantizing scale factor values provided by said apparatus for generating quantizing scale factors.

14. The method set forth in claim 11, wherein compression is performed according to an MPEG protocol, and further including:

provide quantiser_scale_codes corresponding to limited said quantizing scale factors; and including said quantiser_scale_codes in said compressed video signal.

* * * * *